US009400685B1

(12) United States Patent
Ge et al.

(10) Patent No.: US 9,400,685 B1
(45) Date of Patent: Jul. 26, 2016

(54) DIVIDING, SCHEDULING, AND PARALLEL PROCESSING COMPILED SUB-TASKS ON AN ASYNCHRONOUS MULTI-CORE PROCESSOR

(71) Applicants: Yiqun Ge, Ottawa (CA); Wuxian Shi, Ottawa (CA)

(72) Inventors: Yiqun Ge, Ottawa (CA); Wuxian Shi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/610,351

(22) Filed: Jan. 30, 2015

(51) Int. Cl.
*G06F 9/48* (2006.01)
*G06F 15/82* (2006.01)
*G06F 9/45* (2006.01)
*G06F 9/50* (2006.01)

(52) U.S. Cl.
CPC .............. *G06F 9/4881* (2013.01); *G06F 15/82* (2013.01); *G06F 8/45* (2013.01); *G06F 9/50* (2013.01); *G06F 2209/5017* (2013.01)

(58) Field of Classification Search
None
See application file for complete search history.

(56) References Cited

U.S. PATENT DOCUMENTS

| | | | | |
|---|---|---|---|---|
| 5,287,511 A * | 2/1994 | Robinson | ............ | G06F 17/5045 712/E9.03 |
| 5,293,620 A * | 3/1994 | Barabash | ............... | G06F 9/4881 718/102 |
| 6,675,106 B1 * | 1/2004 | Keenan | ...................... | G01J 3/28 702/194 |
| 2005/0135420 A1 | 6/2005 | Chamberlain | | |
| 2007/0220525 A1 * | 9/2007 | State | ...................... | G06F 9/4881 718/107 |
| 2007/0255929 A1 * | 11/2007 | Kasahara | .............. | G06F 1/3203 712/1 |
| 2007/0294696 A1 * | 12/2007 | Papakipos | ............. | G06F 9/5027 718/102 |
| 2008/0163183 A1 * | 7/2008 | Li | ........................... | G06F 8/456 717/149 |
| 2009/0259997 A1 * | 10/2009 | Grover | .................... | G06F 8/456 717/136 |
| 2009/0328047 A1 * | 12/2009 | Li | .......................... | G06F 9/5033 718/102 |
| 2012/0159507 A1 * | 6/2012 | Kwon | ................... | G06F 9/5088 718/104 |
| 2012/0260239 A1 * | 10/2012 | Martinez Canedo | ... | G06F 8/456 717/149 |
| 2012/0297163 A1 * | 11/2012 | Breternitz | ............. | G06F 9/5066 712/22 |
| 2013/0036409 A1 * | 2/2013 | Auerbach | ............... | G06F 8/456 717/140 |
| 2013/0198758 A1 | 8/2013 | Lim et al. | | |
| 2013/0218299 A1 * | 8/2013 | Jie | ...................... | G05B 19/0421 700/4 |
| 2013/0263100 A1 * | 10/2013 | Mizrachi | ................... | G06F 8/41 717/149 |
| 2015/0058858 A1 * | 2/2015 | Plattner | ................. | G06F 9/4881 718/103 |
| 2015/0074380 A1 | 3/2015 | Huang et al. | | |
| 2015/0074382 A1 | 3/2015 | Shi et al. | | |
| 2015/0074446 A1 | 3/2015 | Tong et al. | | |
| 2015/0074680 A1 | 3/2015 | Zhang et al. | | |
| 2015/0082317 A1 * | 3/2015 | You | ........................ | G06F 9/5094 718/104 |
| 2015/0121391 A1 * | 4/2015 | Wang | ..................... | G06F 9/5044 718/104 |

FOREIGN PATENT DOCUMENTS

| | | |
|---|---|---|
| CN | 101339523 A | 1/2009 |
| CN | 102467415 B | 11/2013 |

OTHER PUBLICATIONS

PCT International Search Report and Written Opinion, PCT/CN2015/096571, Feb. 29, 2016, 12 Pages.

* cited by examiner

*Primary Examiner* — Benjamin Wu (57) ABSTRACT

An asynchronous multiple-core processor may be adapted for carrying out sets of known tasks, such as the tasks in the LAPACK and BLAS packages. Conveniently, the known tasks may be handled by the asynchronous multiple-core processor in a manner that may be considered to be more power efficient than carrying out the same known tasks on a single-core processor. Indeed, some of the power savings are realized through the use of token-based single core processors. Use of such token-based single core processors may be considered to be power efficient due to the lack of a global clock tree.

19 Claims, 5 Drawing Sheets

DIVIDING, SCHEDULING, AND PARALLEL PROCESSING COMPILED SUB-TASKS ON AN ASYNCHRONOUS MULTI-CORE PROCESSOR

FIELD

The present application relates generally to processors and, more specifically, to an asynchronous multiple-core processor.

BACKGROUND

Modern processors may be considered to be following a trend toward forming what appears, from the outside, to be a single processor from multiple processors. That is, a plurality of core processors (or, simply, "cores") may be grouped to act as a single processor. Beneficially, multiple-core processors may be seen to have relatively small size and relatively low electrical power consumption when compared to single-core processors. However, obstacles related to use of multiple-core processors include complicated development due to low compatibility. A given software application developed for a four core processor from one manufacturer may not work properly when executed on an eight core processor from a different manufacturer.

BRIEF DESCRIPTION OF THE DRAWINGS

Reference will now be made, by way of example, to the accompanying drawings which show example implementations; and in which.

DETAILED DESCRIPTION

Linear Algebra PACKage (LAPACK) is a standard software library for numerical linear algebra. Conveniently, LAPACK provides routines for solving systems of linear equations and linear least squares, Eigen value problems and singular value decomposition.

Basic Linear Algebra Subprograms (BLAS) are a specified set of low-level subroutines that carry out common linear algebra operations such as copying, vector scaling, vector dot products, linear combinations and matrix multiplication. The BLAS were first published as a FORTRAN library in 1979 and are still used as building blocks in higher-level math programming languages and libraries, including LAPACK.

BLAS subroutines may be considered to be a de facto standard Application Programming Interface (API) for linear algebra libraries and routines. Several BLAS library implementations have been tuned for specific computer architectures. Highly optimized implementations have been developed by hardware vendors.

It has been noticed that LAPACK and BLAS, although originally license-free FORTRAN Linear Algebra Libraries, have become widely accepted industrial routines. Accordingly, many commercial software packages make use of the LAPACK/BLAS libraries. Many chip providers sell chip-oriented LAPACK/BLAS libraries. An advantage of LAPACK/BLAS lies in the separation of high-level software programmers from the low-level, chip-related optimization of linear algebra problems.

However, it may be considered that implementation of the LAPACK and BLAS packages are not performance/power efficient on a single core processor.

In overview, it is proposed herein to adapt an asynchronous multiple-core processor for carrying out sets of known tasks, such as the tasks in the LAPACK and BLAS packages. Conveniently, the known tasks may be handled by the asynchronous multiple-core processor in a manner that may be considered to be more power efficient than carrying out the same known tasks on a single-core processor. Indeed, some of the power savings are realized through the use of token-based single core processors. Use of such token-based single core processors may be considered to be power efficient mainly due to the lack of a global clock tree.

Several patent applications have been filed recently to protect token-based single core processors. These patent applications include U.S. patent application Ser. No. 14/480,531 filed Sep. 8, 2014; U.S. patent application Ser. No. 14/480,556 filed Sep. 8, 2014; U.S. patent application Ser. No. 14/480,561 filed Sep. 8, 2014; and U.S. patent application Ser. No. 14/325,117 filed Jul. 7, 2014, the contents of all of which are incorporated herein by reference.

According to an aspect of the present disclosure, there is provided an asynchronous multiple-core processor. The asynchronous multiple-core processor includes a plurality of self-timed core processors linked with a network bus, a task divider and a task scheduler. The task divider receives a task, divides the task into a plurality of sub-tasks, transmits, to a software library, an indication of a selected sub-task selected from among the plurality of sub-tasks, receives, from the software library, a compiled version of the selected sub-task and transmit, to a sub-task scheduler, the compiled version of the selected sub-task. The sub-task scheduler is configured to receive the compiled version of the selected sub-task, prepares a schedule for the execution of the compiled version of the selected sub-task in context with other compiled versions of sub-tasks, formulates, based on the schedule, an instruction stream and broadcast the instruction stream to the plurality of self-timed core processors.

According to another aspect of the present disclosure, there is provided a method of handling a task in an asynchronous multiple-core processor that includes a plurality of self-timed core processors linked with a network bus. The method includes, at a task divider, receiving the task, dividing the task into a plurality of sub-tasks, transmitting, to a software library, an indication of a selected sub-task selected from among the plurality of sub-tasks, receiving, from the software library, a compiled version of the selected sub-task and transmitting, to a task scheduler, the compiled version of the selected sub-task. The method further includes, at the task scheduler, receiving a compiled version of the sub-task, sensing availability of the plurality of self-timed core processors, preparing a schedule for the execution of the compiled version of the sub-task in context with other compiled versions of sub-tasks, formulating, based on the schedule and the availability, an instruction stream and broadcasting the instruction stream to the plurality of self-timed core processors. In other aspects of the present application, a computer readable medium is provided for adapting an asynchronous multiple-core processor to carry out this method.

Other aspects and features of the present disclosure will become apparent to those of ordinary skill in the art upon review of the following description of specific implementations of the disclosure in conjunction with the accompanying figures.

Figure 1:
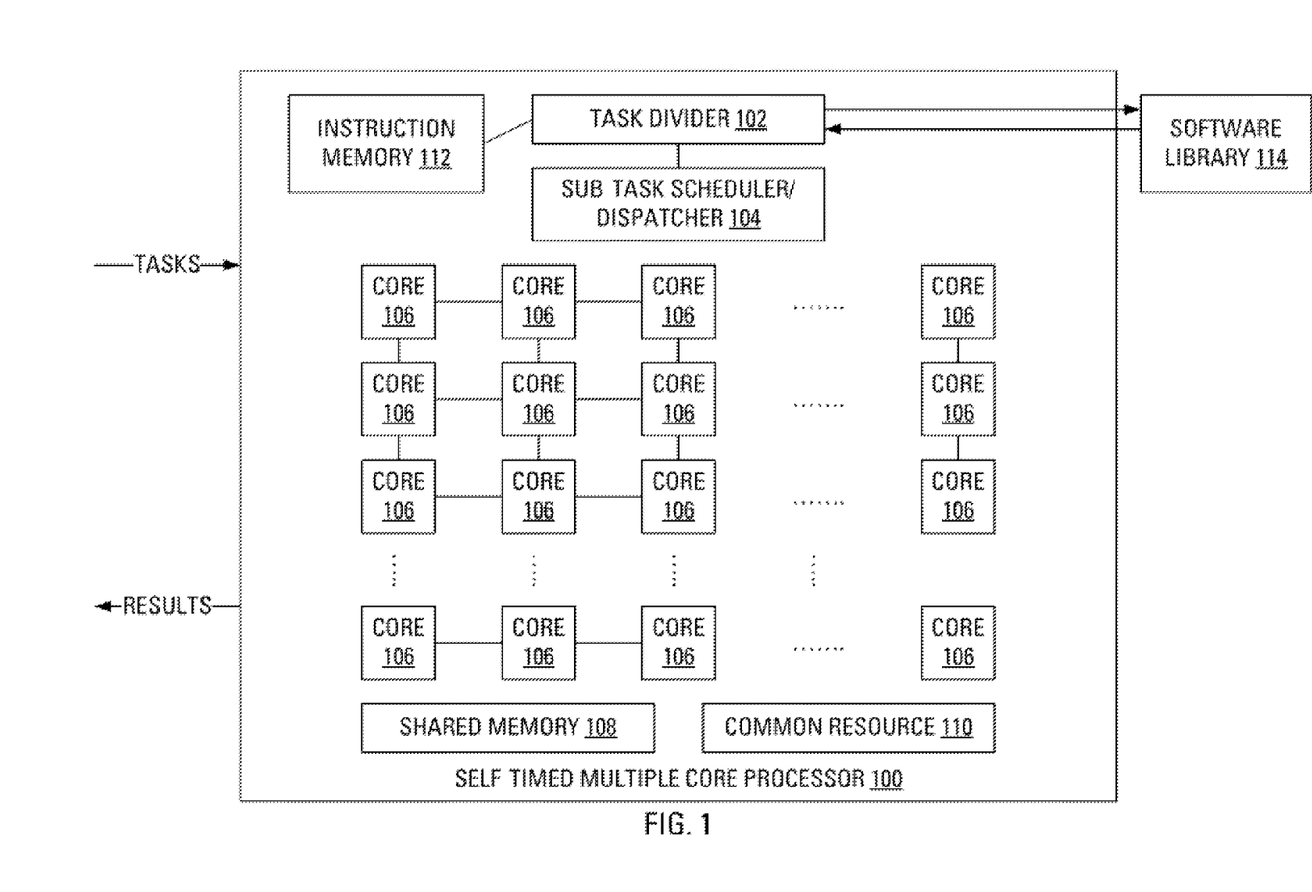
FIG. 1 illustrates an asynchronous multiple-core processor including a task divider and a sub-task scheduler/dispatcher in accordance with an aspect of the present application.

FIG. 1 illustrates, in a block diagram, an asynchronous (self-timed) multiple-core processor 100 having a plurality of self-timed core processors 106, in one die, connected by a network bus. It should be appreciated that the manner of linking the plurality of self-timed cores 106 with each other is open to multiple architectures. For example, the plurality of self-timed cores 106 may be linked in a two-dimensional mesh. For another example, the plurality of self-timed cores 106 may be linked in a three-dimensional mesh. For an even further example, the plurality of self-timed cores 106 may be linked in a one-dimensional slice. In any case, although not specifically illustrated, each individual self-timed core 106 may be associated with a core index, so that instructions may be addressed to an individual self-timed core 106.

Notably, the plurality of self-timed cores 106 lack private instruction memory. All of the plurality of self-timed cores 106 share the same instruction fetch unit. That is, the plurality of self-timed cores 106 are connected to a sub-task-scheduler/dispatcher 104. The sub-task scheduler/dispatcher 104 is connected to a task divider 102. The task divider 102 maintains a connection to an instruction memory 112 and to a software library 114. The software library 114 contains pre-compiled programs for carrying out sub-tasks at the plurality of self-timed cores 106.

The plurality of self-timed cores 106 maintain connections to select ones of each other and to a shared memory 108 and to a common resource 110.

Figure 2:
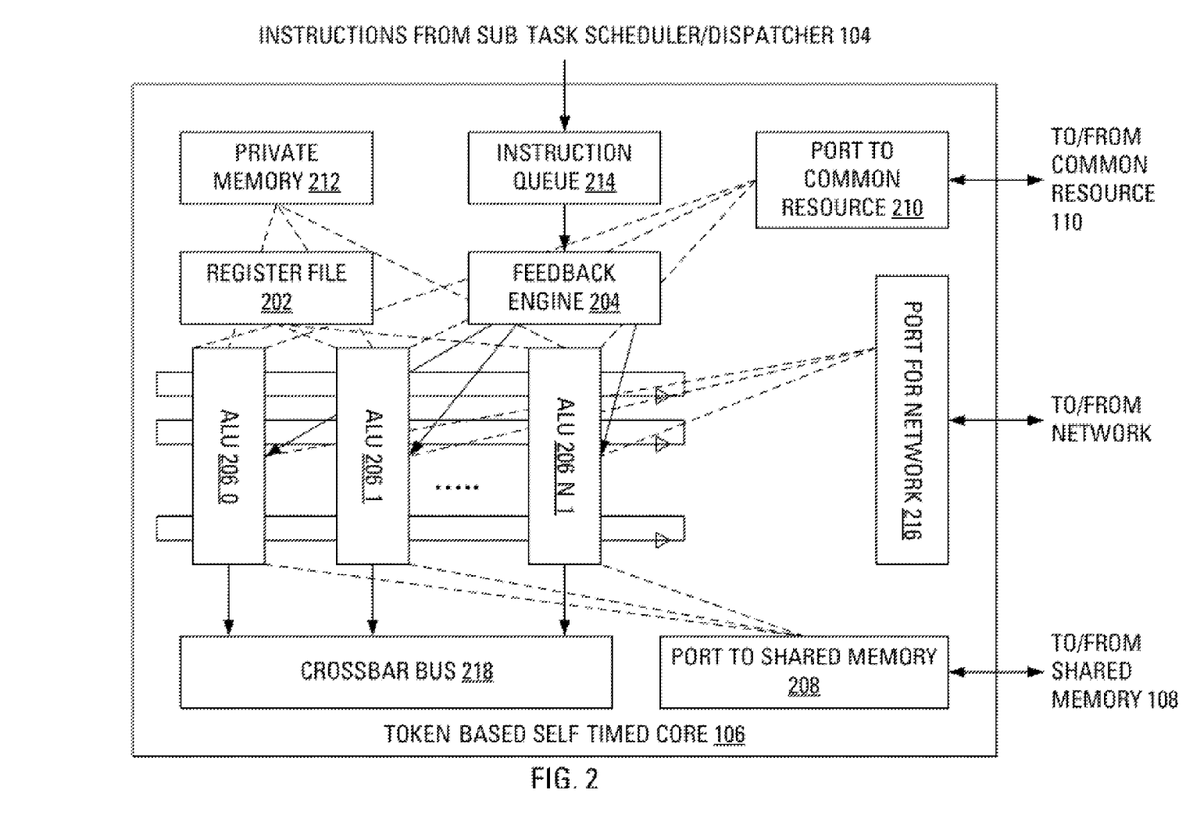
FIG. 2 illustrates a token-based, self-timed core processor for use in the asynchronous multiple-core processor of FIG. 1 in accordance with an aspect of the present application.

FIG. 2 illustrates, in a block diagram, an example one of the self-timed cores 106 of the multiple-core self-timed processor 100 of FIG. 1. The example self-timed core 106 of FIG. 2 has a register file 202, a feedback engine 204 and a number of clockless arithmetic logic units (ALUs) 206 connected to an all-to-all interconnection crossbar bus 218. Where N ALUs 206 are in use, the ALUs 206 may be referenced as a first ALU 206-0, a second ALU 206-1 up to an Nth ALU 206-N−1.

As illustrated in FIG. 2, the example self-timed core 106 also includes a private memory 212, an instruction queue 214 and a plurality of ports. The plurality of ports includes a port 208 to the shared memory 108 of FIG. 1. The plurality of ports also includes a port 210 to the common resource 110 of FIG. 1. The plurality of ports further includes a port 216 to the other self-timed cores 106, and to the sub-task scheduler/dispatcher 104, in the self-timed multiple-core processor 100 of FIG. 1.

Each ALU 206 has its own link to the register file 202, to the private memory 212, to the port 210 to the common resource 110, to the port 216 to the other self-timed cores 106 and to the port 208 to the shared memory 108.

To prepare the self-timed multiple-core processor 100 for use, a LAPACK/BLAS routine (task) is divided into sub-tasks so that elements of the task as a whole may be performed, in parallel where practical, by the plurality of self-timed cores 106. The manner in which a given task may be divided into sub-tasks may be stored in the instruction memory 112. Furthermore, versions of each of the sub-tasks may be stored in software library 114. Such versions are compiled especially for execution by one of the plurality of self-timed cores 106.

Figure 3:
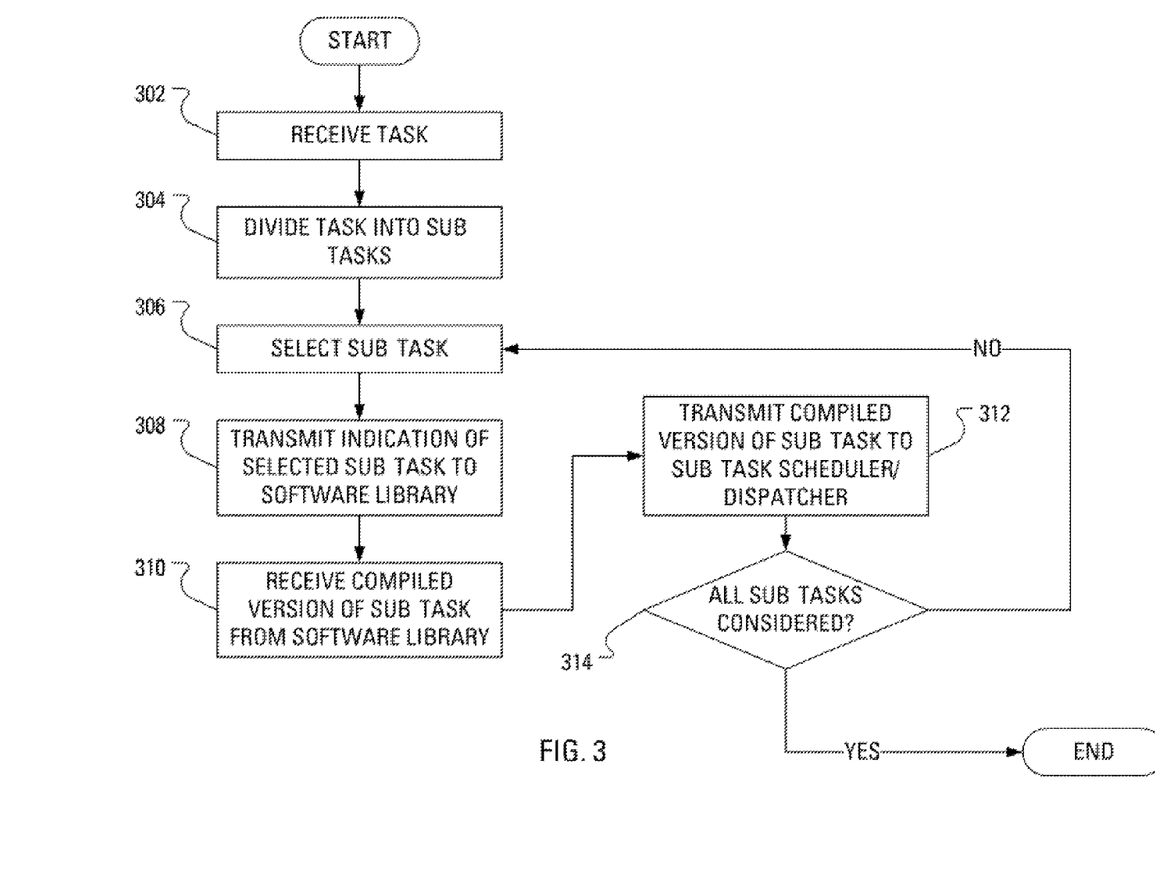
FIG. 3 illustrates example steps in a method, carried out by the task divider of FIG. 1, of handling a received task in accordance with an aspect of the present application.

In operation, a task is received at the self-timed multiple-core processor 100. FIG. 3 illustrates example steps in a method, carried out by the task divider 102, of handling the received task. Initially, the task is received (step 302) by the task divider 102. Using information stored in the instruction memory 112, the task divider 102 divides (step 304) the received task into a plurality of sub-tasks.

The task divider 102 then selects (step 306) one of the sub-tasks and transmits (step 308) an indication of the selected sub task to the software library 114. From the software library 114, the task divider receives (step 310) a version of the selected sub-task. The version of the sub-task has been compiled ahead-of-time for execution by one of the plurality of self-timed cores 106. The task divider then transmits (step 312) the received version of the selected sub-task to the sub-task scheduler/dispatcher 104.

The task divider 102 may then determine (step 314) whether all of the sub-tasks of the received task have been considered. Upon determining (step 314) that not all of the sub-tasks of the received task have been considered, the task divider 102 selects (step 306) another one of the sub-tasks and repeats the transmitting (step 308), receiving (step 310), transmitting (step 312) and determining (step 314). Upon determining (step 314) that all of the sub-tasks of the received task have been considered, the task divider 102 may consider the method to be complete.

Figure 4:
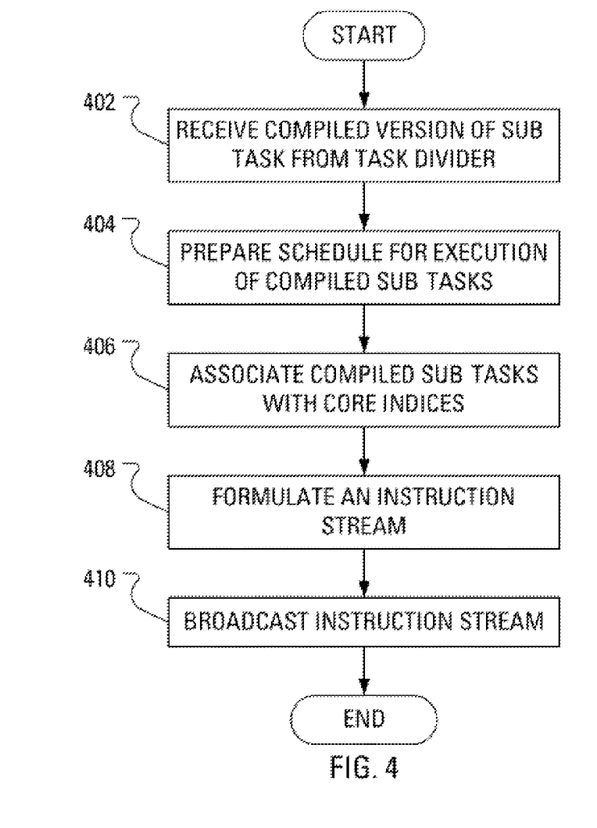
FIG. 4 illustrates example steps in a method, carried out by the sub-task scheduler/dispatcher, of scheduling and dispatching received compiled sub-tasks in accordance with an aspect of the present application.

FIG. 4 illustrates example steps in a method, carried out by the sub-task scheduler/dispatcher 104, of scheduling and dispatching the received compiled sub-tasks.

In operation, at the sub-task scheduler/dispatcher 104, the compiled version of each of the sub-tasks is received (step 402) from the task divider 102. The sub-task scheduler/dispatcher 104 may prepare (step 404) a schedule for execution of the compiled sub-tasks. It will be appreciated that some compiled sub-tasks may be executed simultaneously with other compiled sub-tasks, while execution of other compiled sub-tasks may depend on the complete execution of specific compiled sub-tasks. Once the sub-task scheduler/dispatcher 104 has prepared (step 404) a schedule for execution of the compiled sub-tasks, the sub-task scheduler/dispatcher 104 may then associate (step 406) each compiled sub-task with a core index for a respective one of the self-timed cores 106. The sub-task scheduler/dispatcher 104 may then formulate (step 408), based on the schedule and the associating, an instruction stream. The sub-task scheduler/dispatcher 104 may then broadcast (step 410) the instruction stream to all of the self-timed cores 106.

Figure 5:
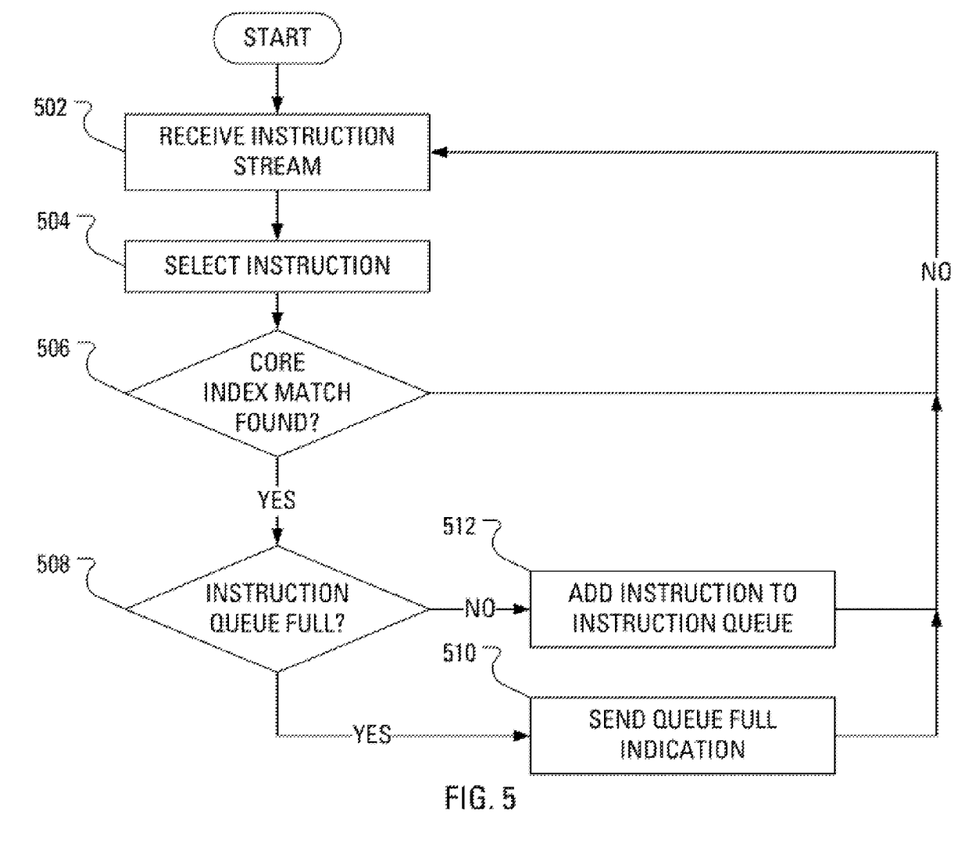
FIG. 5 illustrates example steps in a method, carried out by the example self-timed core processor of FIG. 2, of handling an instruction stream in accordance with an aspect of the present application.

FIG. 5 illustrates example steps in a method, carried out by the example self-timed core 106, of handling an instruction stream.

In operation, at each of the self-timed cores 106, the instruction stream is received (step 502) at the instruction queue 214. If the instruction queue 214 is full, the instruction queue 214 transmits a queue-full indication to the sub-task scheduler/dispatcher 104. For clarity, the instruction stream is illustrated in FIG. 2 as being received directly at the instruction queue 214. It should be clear that the instruction stream is received at the instruction queue 214 via the port 216 to the other self-timed cores 106 and to the sub-task scheduler/dispatcher 104.

The example self-timed core 106 may select (step 504) an instruction in the instruction stream and examine the core index associated with the selected instruction to determine (step 506) whether the core index associated with the instruction is a match for the core index associated with the example self-timed core 106. Upon determining (step 506) that the core index associated with the instruction is a match for the core index associated with the example self-timed core 106, the example self-timed core 106 may determine (step 508) whether the instruction queue 214 is full. Responsive to determining (step 508) that the instruction queue 214 is full, the example self-timed core 106 may send (step 510) a queue-full indication to the sub-task scheduler/dispatcher 104. Responsive to determining (step 508) that the instruction queue 214 is not full, the example self-timed core 106 may add (step 512) the instruction to the instruction queue 214. Upon determining (step 506) that the core index associated with the compiled sub-task is not a match for the core index associated with the example self-timed core 106, the example self-timed core 106 may ignore the compiled sub-task.

Subsequent to the instruction being added to the instruction queue 214, the feedback engine 204 may fetch the instruction from the instruction queue 214. The feedback engine 204 may maintain a scoreboard table to detect and register the data dependency among the instructions. Furthermore, the feedback engine 204 may dispatch a registered instruction to one ALU 206 in a program counter order. To avoid resource conflicts among the ALUs 206, tokens are used to allow only one ALU 206 to access one resource at a given period of time. The output of an ALU 206 can be immediately transmitted or multicast to any of the other ALUs 206.

To form a pipeline or something similar, a processor may be equipped with mechanisms for: (1) preserving the program-counter (PC) order; (2) detecting and resolving structural hazards; and (3) detecting and resolving data hazards. In the token-based, self-timed core processor 106, the mechanism for (1) and the mechanism for (2) are realized by its token system and the mechanism for (3) by is realized by the crossbar (interconnection) bus 218 and the feedback engine (scoreboard) 204.

A couple of the self-timed ALUs 206 may be serially linked by several special asynchronous signals named as tokens. A token is a special asynchronous edge-sensitive signal that goes through the first ALU 206-0, the second ALU 206-1 up to the Nth ALU 206-N−1. After being issued from the Nth ALU 206-N−1, a token signal passes into an inverter that inverts the signal polarity and then passes the inverted token signal to the first ALU 206-0. When a token reaches a given ALU 206, the given ALU 206 is said to "own" the token. The property that only one ALU 206 holds the ownership of a given token at any instant of time enables the token to be a good candidate to resolve a structural hazard for common resources. While owning a token, an ALU 206 may not consume it immediately. Instead, the ALU 206 may lock the token by a latch (or SR flip-flop) logic until the consumption conditions for the token are satisfied. Alternatively, the ALU 206 may pass the token signal to the next ALU 206 as quickly as possible, upon deciding not to consume the token. Usually, an ALU 206 has made a decision about a particular token prior to the arrival of the particular token. The two ways the tokens are processed are referred to as "consuming" a token or "bypassing" a token.

The pipeline may be achieved by the token system in the following two aspects: an intra-ALU token-gating system; or an inter-ALU token passing system.

In the intra-ALU token-gating system, certain tokens gate other tokens. That is, releasing one token becomes a condition to consuming another token. The gating signals from the preceding tokens are input into the consumption condition logic of the gated token. For example, a launch-token may generate an active signal to a register read token when released to the next ALU 206, which establishes that any ALU 206 will not read the register file 202 until an instruction is "officially" started by the launch-token.

In the inter-ALU token passing system, a consumed token signal may trigger a pulse to a common resource. For example, a register-access token may trigger a pulse to the register file 202. Meanwhile, the token signal is delayed before the token signal is released to the next ALU 206 for such a period that there is no structural hazard on a common resource between ALU-(n) and ALU-(n+1).

Tokens may be considered to not only preserve an ability for multiple ALUs 206 to launch and commit instructions in the PC order, but also to avoid structural hazards among the multiple ALUs 206.

The data hazard is detected and resolved by the feedback engine 204 and the crossbar bus 218. Multiple ALUs 206 are linked by the crossbar bus 218. In general, each ALU 206 has one output to the crossbar bus 218 and three inputs (for clarity, not shown) from the crossbar bus 218.

The RAW (read-after-write) hazard may be avoided as follows. When an ALU 206 writes to the crossbar bus 218, the ALU 206 broadcasts a "done" signal on the crossbar bus 218 to inform other ALUs 206. When an ALU 206 requests data from the crossbar bus 218, the ALU 206 monitors the "done" signal from the targeted ALU 206. If the "done" signal has been broadcast, the ALU 206 pulls the data from the crossbar bus 218. If the "done" signal has not been broadcast, the ALU 206 waits for the "done" signal to be broadcast by the targeted ALU. In this way, the data hazard among the instructions on different ALUs 206 may be resolved.

The register and memory commitment may be considered to be in a post-commit mode: writing to the register file 202 and/or to the private memory 212 take place after the commit-token is released. The crossbar bus 218 may play the role of "register renaming" to avoid a WAR (write-after-read) and a WAW (write-after-write).

Data hazards may be detected by the feedback engine 204 at the instruction-fetch stage.

Instructions that come from the instruction queue 214 may pass through the feedback engine 204 that detects the data dependency by, for example, using a history table. The feedback engine 204 may pre-decode the instruction to decide how many input operands the instruction requires. Subsequently, the feedback engine 204 may look to the history table to find whether a given piece of data is in the crossbar bus 218 or in the register file 202. If the data remains in the crossbar bus 218, the feedback engine 204 may calculate which ALU 206 produces the data. This information may be tagged to the instruction dispatched to the ALUs 206.

At the end of each sub-task, there may be a return instruction and a barrier synchronization instruction. The feedback engine 204 may receive a return signal from the ALU 206 that completes the last instruction. Upon receipt of the return signal from the ALU 206, the feedback engine 204 may report to the sub-task scheduler/dispatcher 104. The results of the execution of the instructions in the sub-task are maintained in an address in the shared memory 108. The address in the shared memory 108 at which the results of the execution of the instructions in the sub-task are maintained may be pre-established by the task received in step 302 (see FIG. 3). Accordingly, the instructions in each subsequent sub-task, can access the results.

Upon completion of execution of all the instructions in the compiled sub-tasks by the self-timed cores 106, it may be considered that the task, received by the task divider 102 in step 302, has been completed. It is expected that the entity from which the task is received in step 302, can retrieve the results of the execution of the task from the pre-established address in the shared memory 108.

If, for example, the task was a LAPACK/BLAS routine, the self-timed multiple-core processor 100 may return the result in a format specified in an API for such LAPACK/BLAS routines.

For example, consider the task of matrix addition. As part of an API, a processor external to the self-timed multiple-core processor 100 may call a specific matrix addition API by providing two matrices and a request that the two matrices be added. The API call may be received (step 302) at the self-timed multiple-core processor 100 as a task. The task divider 102 may divide (step 304) the matrix addition task into sub-tasks. Notably, addition of two relatively large matrices may be divided into a plurality of distinct addition operations (sub-tasks) on smaller matrixes.

The task divider 102 may select (step 306) a sub-task and transmit (step 308) the selected sub-task to the software library 114. Notably, the task divider may receive (step 310) compiled versions of many sub-tasks from different tasks at the same time. It may be that some sub-tasks request more resources, e.g., more self-timed cores 106, than other sub-tasks.

Based on the compiled versions of sub-tasks received (step 402) from the task divider 102, the sub-task scheduler 104 may formulate (step 408) an instruction stream for broadcast (step 410) to the self-timed cores 106. Notably, the sub-task scheduler/dispatcher 104 may sense, detect or otherwise determine the current availability of each of the self-timed cores 106. Consequently, the formulating (step 408) of the instruction stream may be carried out as a function of the current availability of the self-timed cores 106.

These distinct addition operations (sub-tasks) may be carried out, in parallel, by the plurality of self-timed cores 106.

Subsequent to results being determined for each of the sub-tasks, the sub-task scheduler/dispatcher 104 may formulate (step 408) and broadcast (step 410) an instruction stream including a further sub-task to combine the sub-task results to form a matrix that is the final result of the requested matrix addition operation.

The self-timed multiple-core processor 100 may then return the result of the matrix addition operation as a reply to the matrix addition API call.

Conveniently, the task divider 102, the sub-task scheduler/dispatcher 104 and the software library 114 are programmable. Accordingly, two distinct people may opt to divide a given task into sub-tasks in two distinct manners. Correspondingly, the compiled versions of the sub-tasks in the software library 114 will also be distinct. Furthermore, the programming of the sub-task scheduler to define a scheduling strategy may be tied to the manner in which the given task has been divided into sub-tasks.

Conveniently, the decisions regarding the manner in which a task is divided into sub-tasks, the programming and compiling of the sub-tasks, and the scheduling of the sub-tasks may be left to experts, thereby relieving programming effort from those who merely want to arrange that the tasks are carried out.

The performance of a multiple-core processor may be attributed, in part, to parallelism. The parallelism can be enhanced on at least three different levels: an instruction-level; a thread-level; and a processor-level. Enhancement of the performance of a multiple-core processor may be accomplished by improving parallelism.

In the framework of the present application, the improvement of the parallelism may achieved by both software and hardware.

At the level of a single self-timed core 106, responsive to receiving (step 502) an instruction stream, the self-timed core 106 uses the instruction queue 214 to improve instruction-level-parallelism (ILP). This is an example of achieving parallelism improvement through a hardware implementation.

At the level of the plurality of self-timed cores 106, it may be considered that software controls the manner in which a loop may be decomposed into multiple loop bodies, where each loop body is executed by one of the self-timed cores 106, thereby improving thread-level-parallelism (TLP). This is an example of achieving parallelism improvement through a software implementation in combination with a hardware implementation.

On top of the ILP and TLP, aspects of the present application have introduced the task and the related sub-tasks. A task may be considered to correspond to a LAPACK/BLAS routine call. The combination of software and hardware proposed in the present application allows for reception and scheduling of several tasks at the same time, if the tasks are independent of each other. Accordingly, the processor has two further levels of parallelism: task-level parallelism; and sub-task-level parallelism.

Each self-timed core 106 of a plurality of cores 106 can work at a slower rate than a comparable single-core processor. As a result of employing a plurality of such cores 106 to carry out one routine, it may be seen that power efficiency is enhanced. Conveniently, if a given self-timed core 106 is not provided with a compiled sub-task to execute, then the given self-timed core 106 does not consume dynamic power.

Routines defined in the LAPACK and BLAS packages are widely used in many domains. The combination of software and hardware proposed in the present application may act as a replacement for a software implementation of a LAPACK/BLAS library of routines.

It has been noted hereinbefore that the parallelization of the execution of the sub-tasks is programmable and, as such, a programmer can focus on how to maximally parallelize a routine. However, it is further noted that, once the programmer is content with the manner in which a routine has been parallelized, there is unlikely to be a need to rewrite code to accommodate a change from a multiple-core processor with one number of cores to a multiple-core processor with more cores.

The combination of software and hardware proposed in the present application may be seen to realize an advantage in that the bottleneck to access each instruction may be considered to have been overcome. Many consider that, with modern processors, memory access throughput rather than computational logics has become the primary performance bottleneck.

It has been noted that a self-timed core 106 does not need a global clock tree. It may be shown that eliminating a global clock tree may reduce the power of the processor by as much as save 30%. More importantly, as the number of cores increases up to hundreds and thousands, it may become increasingly less practical to have a global tree on a large die.

If the number of cores increases up to hundreds or even thousands, heat reduction becomes an issue for a multi-core processor. The heat reduction issue, in turn, presents a difficulty for backend routing. Conveniently, in aspects of the present application, it may be shown that idle self-timed cores 106 use little-to-no power and, accordingly, generate little-to-no heat.

Most probably, a software application cannot use up all of the self-timed cores 106. It is anticipated that some of the self-timed cores 106 will be idle at least some of the time. In a synchronous design, power gating is required to switch off idle cores. However, such power gating requires a certain level of granularity. For example, it may be considered much more costly to allocate a power area for a single core than for a group of cores. Accordingly, the granularity required for a synchronous design may be considered to be great. In contrast, since there is no clock on the self-timed core 106, the granularity in aspects of the present application may be considered to be very small. Every self-timed core 106 that enters into idle (when no compiled sub-task is being executed) consumes little-to-no power.

The synchronous core needs the clock signal to check the instruction availability and update the state of its own resource usage. However, a self-timed core 106 can function like a queue: when all of its resources (computation and logic unit) are busy, the self-timed core 106 can automatically push a received compiled sub-task back to the sub-task scheduler/dispatcher 104. This feature provides a natural indicator of the status of the self-timed cores 106 for the sub-task scheduler/dispatcher 104. Responsively, the sub-task scheduler/dispatcher 104 may dynamically schedule multiple sub-tasks as a function of the instant status of the cores.

The above-described implementations of the present application are intended to be examples only. Alterations, modifications and variations may be effected to the particular implementations by those skilled in the art without departing from the scope of the application, which is defined by the claims appended hereto.

What is claimed is:

1. An asynchronous multiple-core processor comprising:
a plurality of self-timed core processors linked with a network bus;
a task divider executing on the asynchronous multiple-core processor and configured to:
receive a task;
divide the task into a plurality of sub-tasks;
transmit, to a software library, an indication of a selected sub-task selected from among the plurality of sub-tasks;
receive, from the software library, a compiled version of the selected sub-task; and
transmit, to a sub-task scheduler, the compiled version of the selected sub-task; and
the sub-task scheduler executing on the asynchronous multiple-core processor and configured to:
receive the compiled version of the selected sub-task;
determine current availability of the plurality of self-timed core processors;
prepare a schedule for the execution of the compiled version of the selected sub-task in context with other compiled versions of sub-tasks;
associate each compiled version of the sub-tasks with a core index for a respective one of the plurality of self-timed core processors;
formulate, based on the schedule and the current availability, an instruction stream; and
broadcast the instruction stream to all of the plurality of self-timed core processors.

2. The asynchronous multiple-core processor of claim 1 further comprising an instruction memory storing information for use by the task divider when carrying out the dividing the task into the plurality of sub-tasks.

3. The asynchronous multiple-core processor of claim 1 wherein a self-timed core processor in the plurality of self-timed core processors is configured to:
select an instruction in the instruction stream and examine the core index associated with the selected instruction; and
determine whether the core index associated with the selected instruction is a match for the core index of the self-timed core processor.

4. The asynchronous multiple-core processor of claim 3 wherein the self-timed core processor is further configured to:
add the selected instruction to an instruction queue of the self-timed core processor upon determining that the core index associated with the selected instruction is a match for the core index of the self-timed core processor.

5. The asynchronous multiple-core processor of claim 1 wherein the task is related to a routine in a standard software library.

6. The asynchronous multiple-core processor of claim 5 wherein the standard software library comprises the Linear Algebra Package (LAPACK).

7. The asynchronous multiple-core processor of claim 5 wherein the standard software library comprises the Basic Linear Algebra Subprograms (BLAS).

8. A method of handling a task in an asynchronous multiple-core processor that includes a plurality of self-timed core processors linked with a network bus, the method comprising:
at a task divider:
receiving the task;
dividing the task into a plurality of sub-tasks;
transmitting, to a software library, an indication of a selected sub-task selected from among the plurality of sub-tasks;
receiving, from the software library, a compiled version of the selected sub-task; and
transmitting, to a sub-task scheduler, the compiled version of the selected sub-task;
at the task scheduler:
receiving a compiled version of the sub-task;
determining current availability of the plurality of self-timed core processors;
preparing a schedule for the execution of the compiled version of the sub-task in context with other compiled versions of sub-tasks;
associating each compiled version of the sub-tasks with a core index for a respective one of the plurality of self-timed core processors;
formulating, based on the schedule and the current availability, an instruction stream; and
broadcasting the instruction stream to all of the plurality of self-timed core processors.

9. The method of claim 8 wherein the dividing the task into the plurality of sub-tasks further comprises using an instruction memory storing information for use in the dividing.

10. The method of claim 8 wherein the task comprises a task related to a routine in a standard software library.

11. The method of claim 10 wherein the standard software library comprises the Linear Algebra Package (LAPACK).

12. The method of claim 10 wherein the standard software library comprises the Basic Linear Algebra Subprograms (BLAS).

13. The method of claim 8 wherein a self-timed core processor in the plurality of self-timed core processors configured to:
select an instruction in the instruction stream and examine the core index associated with the selected instruction; and
determine whether the core index associated with the selected instruction is a match for the core index of the self-timed core processor.

14. A non-transitory computer-readable medium containing computer-executable instructions that, upon execution in an asynchronous multiple-core processor that includes a plurality of self-timed core processors linked with a network bus, the execution causes:
- a task divider to:
  - receive a task;
  - divide the task into a plurality of sub-tasks;
  - transmit, to a software library, an indication of a selected sub-task selected from among the plurality of sub-tasks;
  - receive, from the software library, a compiled version of the selected sub-task; and
  - transmit, to a sub-task scheduler, the compiled version of the selected sub-task;
- the sub-task scheduler to:
  - receive a compiled version of a sub-task;
  - determine current availability of the plurality of self-timed core processors;
  - prepare a schedule for the execution of the compiled version of the subtask in context with other compiled versions of sub-tasks;
  - associate each compiled version of the sub-tasks with a core index for a respective one of the plurality of self-timed core processors;
  - formulate, based on the schedule and the current availability, an instruction stream; and
  - broadcast the instruction stream to all of the plurality of self-timed core processors.

15. The non-transitory computer-readable medium of claim 14 wherein the task divider divides the task into the plurality of sub-tasks by using an instruction memory storing information for use in the dividing.

16. The non-transitory computer-readable medium of claim 14 wherein the task comprises a task related to a routine in a standard software library.

17. The non-transitory computer-readable medium of claim 16 wherein the standard software library comprises the Linear Algebra Package (LAPACK).

18. The non-transitory computer-readable medium of claim 16 wherein the standard software library comprises the Basic Linear Algebra Subprograms (BLAS).

19. The non-transitory computer-readable medium of claim 14 wherein a self-timed core processor in the plurality of self-timed core processors is configured to:
- select an instruction in the instruction stream and examine the core index associated with the selected instruction; and
- determine whether the core index associated with the selected instruction is a match for the core index of the self-timed core processor.

* * * * *